United States Patent [19]
Armiñana Terrasa et al.

[11] Patent Number: 5,992,969
[45] Date of Patent: Nov. 30, 1999

[54] POSITION ENCODING SYSTEM AND METHOD USING A COMPOSITE CODESTRIP

[75] Inventors: Marcos Armiñana Terrasa; José Manuel Díez San Martín, both of Barcelona, Spain

[73] Assignee: Hewlett-Packard Company, Palo Alto, Calif.

[21] Appl. No.: 08/657,722

[22] Filed: May 30, 1996

[51] Int. Cl.[6] .................................................. B41J 23/00
[52] U.S. Cl. ........................................................ 347/37
[58] Field of Search ............................. 347/37; 400/279, 400/320, 322, 283, 703, 705, 705.1, 705.5; 250/237 R, 237 G; 33/1 M, 18.1, 19.1, 19.2, 20.2

[56] References Cited

U.S. PATENT DOCUMENTS

| | | | |
|---|---|---|---|
| 699,524 | 5/1902 | Hoag ........................................ | 400/705 |
| 4,544,931 | 10/1985 | Watanabe et al. ...................... | 347/37 |
| 5,172,250 | 12/1992 | Tsuchiya et al. ....................... | 359/566 |
| 5,276,970 | 1/1994 | Wilcox et al. .......................... | 347/37 |
| 5,331,680 | 7/1994 | Ueno ....................................... | 347/37 |
| 5,397,192 | 3/1995 | Khormaee .............................. | 400/708 |
| 5,411,340 | 5/1995 | Elgee ...................................... | 400/279 |
| 5,600,350 | 2/1997 | Cobbs et al. ........................... | 347/19 |
| 5,620,266 | 4/1997 | Kim ........................................ | 400/279 |

*Primary Examiner*—N. Le
*Assistant Examiner*—L. Anderson
*Attorney, Agent, or Firm*—David S. Romney

[57] ABSTRACT

An elongated encoder-strip scale, most typically plastic, is secured to an elongated encoder-strip substrate, most typically metal. The scale has indicia that are at least partially exposed for use in determining the position of a carriage with respect to a chassis in a large-format automatic image-related device—which may be for example a printer, a plotter, or a scanner. The chassis of the image-related device supports an image-bearing sheet, and the carriage scans across the chassis carrying apparatus for forming or sensing marks on the sheet. Preferably the scale is taller than the substrate and mounted to overlap both edges of the substrate, guarding the edges of the substrate. The scale is preferably substantially transparent and mounted for transmission of an optical beam. The substrate is preferably tensioned across the chassis (preferably at a tension under which the scale alone would fail) and threaded, with the scale, through an aperture in the carriage—even during scanning. The scale is preferably without direct support by the chassis. Preferably the scale or substrate, or both, are used in common—but in different relative positions—in more than one model of image-related device.

31 Claims, 6 Drawing Sheets

POSITION ENCODING SYSTEM AND METHOD USING A COMPOSITE CODESTRIP

RELATED PATENT DOCUMENT

U.S. Pat. No. 5,276,970 of Darren W. Wilcox and Joseph P. Milkovitz, entitled "CODESTRIP IN A LARGE-FORMAT IMAGE-RELATED DEVICE", teaches use of an all-metal codestrip in a large-format printer/plotter or scanner. That patent in its entirety is hereby incorporated by reference into this document.

FIELD OF THE INVENTION

This invention relates generally to image-related devices and procedures. Such "image related" devices and procedures encompass both printing and sensing of images—in other words, both printers and scanners, together with procedures for both.

Thus the invention relates to machines and procedures for printing text or graphics on printing media such as paper, transparency stock, or other glossy media; and more particularly to an encoding system and method for a large-format printing machine that constructs text or images from individual ink spots created on a printing medium, in a two-dimensional pixel array.

Similarly the invention relates to machines and procedures for sensing or scanning of images; and more particularly to an encoding system and method for a large-format scanner that reads text or artwork, or both, as a two-dimensional pixel array.

BACKGROUND OF THE INVENTION

As explained in the patent of Wilcox and Milkovitz, encoder strips or "codestrips" are used in image-related devices such as printer/plotters, scanners, facsimile machines and the like. A codestrip helps establish the position of a marking or sensing device that is mounted for scanning across a printing medium on which an image is to be printed, or from which an image is to be read.

The word "scan" (with its related term "scanner") is commonly used in two senses. A first meaning refers to travel of a carriage transversely across an image that is being either printed or sensed. The carriage holds a marking or sensing device that either forms or reads the image, respectively. In this type of apparatus the transversely scanning device forms or reads one line or swath of pixels across the image, and then the image-bearing page or sheet is moved in an orthogonal direction—lengthwise—so that the marking or sensing device can form or read the next line or swath. In this way eventually the entire image is formed or read.

The second meaning refers much more specifically to reading, not forming, an image. In this sense, "scan" (or "scanner") applies to devices that read images, whether or not they have any scanning motion in the first sense described in the preceding paragraph, above. Thus a "scanner" may employ a long linear array of sensing elements that extends all the way across an image—so that there is no need for transverse motion. Usually in this type of scanner an image-bearing page moves lengthwise past the sensor array, and the scanning is in this direction only.

The present invention relates only to devices that scan in the first sense described above. This invention relates to determination and control of carriage position and velocity, for the carriage which holds the marking or sensing device.

A codestrip is a graduated strip, generally disposed across an area where the medium is held, and having graduations that can be automatically sensed. Historically codestrips have been made of polymeric material such as that known commercially as Mylar®, with graduations formed photographically.

For optimum performance, the codestrip graduations should be very close to both a light source and a detector used as parts of a sensing system to read the graduations. This condition has been met most effectively by threading the codestrip through a narrow transverse aperture in the transversely scanning carriage.

Immediately to one side of the aperture is an optical source and immediately to the other, a detector. The codestrip is tensioned, to at least minimize its rubbing or flapping against the rapidly moving surfaces of the narrow aperture as well as to provide reasonable straightness (and thus a systematic uniformity in the readings).

These polymeric strips serve well in desktop devices for dealing with printing-medium sheets of about twenty centimeters (8½ inch) in width—or somewhat larger, up to for example about thirty centimeters (twelve inches). For progressively wider images, however, due to various factors detailed in the above-mentioned patent, polymeric strips have been progressively less satisfactory.

Such factors include expansion and contraction due to temperature and humidity, and stretch or "creep" with elevated temperature and increasing tension. In a large-format machine for dealing with images some fifty-five centimeters (twenty-two inches) across, these deficiencies are very difficult to manage in an economic way.

Wilcox and Milkovitz responded to these difficulties with a codestrip made entirely of metal, about 0.051 millimeter (0.0020 inch) thick. The scale graduations are a series of extremely fine orifices, etched through the metal.

This type of strip performs superbly in terms of machine operation—but etching through metal inherently produces orifice boundaries which are not as accurate as the boundaries of graduations (lines) that can be formed on film. As will be understood, this limitation arises in part because the thickness of the strip, for a reasonably strong strip, is not much smaller than the width of the windows.

For example Wilcox and Milkovitz describe a strip with 0.051 mm thickness and 0.08 mm windows. Thus etching tends to undercut the resist, or otherwise modify the structure of the strip—irregularly, leading to nonreproducible edges—as well as forming intended orifices.

This characteristic limits the image resolution that can be achieved using a metal codestrip, with little room for advancement in this aspect of the art. In addition the metal strip may present a risk of injury through unintended contact with thin metal edges. Also the metal strip is somewhat less versatile or readily modified.

With regard to versatility, because these codestrips are so long a very large tool or fixture is needed to make several strips. As a result, even a small change entails large expenses in retooling.

For example in some printers or plotters for operator convenience it is desirable to lengthen the travel of the pen carriage to accommodate related devices—for example a pen-refilling station—inside the case of the apparatus. More generally, in a commercial context it is desirable to offer printer/plotter products having various levels of performance and cost.

These simple sorts of changes do not actually implicate the encoding function of the codestrip, but merely require it to be slightly longer or shorter. With a metal codestrip, however, even such simple mechanical modifications become a significant project in terms of retooling cost.

Furthermore, continuing use and maintenance of a separate custom tool is likely to be needed, for each such minor variation among strips. Some of these diverging requirements can be avoided by thoughtfulness in design, but usually at additional cost or inconvenience of some other sort—to circumvent the different mechanical constraints.

In summary a metal strip is much less versatile or readily modified to suit varying requirements than a film strip, which can be fabricated from any new master pattern quickly and easily, even in small quantities, by inexpensive photographic techniques.

In use of metal codestrips a more fundamental limitation arises from the metal-etching technology that is used to form the apertures or windows. The higher the resolution desired, of course the smaller the window width needed.

To maintain a reasonably orderly control over shapes during etching, however, as mentioned above the thickness of the metal strip must be on the same order as the window width, and preferably at least somewhat smaller. Thus higher resolution in the pixel grid of the plotter demands a thinner metal band.

Using a significantly thinner strip introduces greater metal creep, impairing a major benefit of the metal-strip system over plastic—namely dimensional stability. In addition a thinner strip may heighten any risk of injury in the field, and requires much greater care to avoid breakage during assembly and testing.

The potential for breakage leads to a requirement for great care and relatively difficult manipulations in assembly, testing and service—all translating into hidden costs or other impediments for higher-resolution plotters. Thus the metal codestrip tends to impede the progress of the art toward higher performance and particularly higher resolution.

Another known form of codestrip involves use of a scale that is formed on film, such as for example a polymeric film. The film scale is glued to a rigid panel or plate of the apparatus case or chassis.

While such a system has some advantages, it is undesirable in that the scale is not readily and economically brought into very close proximity with the sensing system that must read the scale.

Thus important aspects of the printing technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first facet or aspect of its aspects, the invention is a position encoding system for a large-format automatic image-related device. The device has a chassis for supporting an image-bearing sheet.

It also has a carriage which scans across the chassis, carrying apparatus for forming or sensing marks on the sheet. The position encoding system includes an elongated encoder-strip substrate tensioned across the chassis.

The system also includes an elongated polymeric encoder-strip scale secured to the substrate, and tensioned with the substrate across the chassis. The scale has indicia exposed for use in determining the carriage position with respect to the chassis.

The foregoing may constitute a description or definition of the first facet of the invention in its broadest or most general form. Even in this general form, however, it can be seen that this aspect of the invention significantly mitigate the difficulties left unresolved in the art.

In particular the substrate can be made to sustain all the mechanical requirements of the encoding strip, equally as well as the metal strip of Wilcox and Milkovitz—while the scale performs the optical functions, not merely just as well as that metal strip, but actually much better. The substrate material can be selected and dimensioned both for insignificant strain response ("creep") to tension, and negligible deformation response to atmospheric conditions—without any regard for optical or chemical-etching characteristics.

Because the scale is tensioned with the substrate—or to put it another way merely lies along the tensioned substrate—rather than being tensioned independently, the substrate will in a sense minimize stress as well as environmental response in the scale. These changes significantly reduce the sensitivity of the scale to the effects of temperature and humidity as well as creep under tension.

Through use of the polymeric scale, the advantages of fine resolution—with ample room for improvement as the demands of the art escalate—are restored. At the same time, as will be seen, means become available for guarding, as needed, the substrate edges against potential injury. Amenability of the overall codestrip technology to rapidly varying scale-pattern requirements is achieved in the bargain, with the capability to economically maintain an inventory of numerous patterns.

Costs for the two components of the composite strip, with necessary affixing provisions and procedures, are actually less than the cost of an all-metal strip. Such a cost differential results partly from the lower cost of photographic formation of the polymer-based scale, in comparison with photoetching of a metal strip, and partly from the easier handling and much more readily standardized tooling.

Although this aspect of the invention in its broad form thus represents a significant advance in the art, it is preferably practiced in conjunction with certain other features or characteristics that further enhance enjoyment of overall benefits.

For example, it is preferred that the substrate be metal—and also that the scale be taller than the height of the substrate, and mounted to overlap both edges of the substrate. It is desirable to provide means for guarding the thin edges of a metal strip; in fact this mounting of the polymeric scale to extend above the top edge and below the bottom edge of the substrate provides just such means, and has been found very effective.

On the other hand, with this composite strip—since the metal need not be etched—if desired it is feasible to employ a considerably thicker metal strip, whose edges are not as susceptible to possible accidents, and with thickness entirely independent of the fineness of resolution desired in the scale.

For the present invention just one version of a metal strip is sufficient for all (three) current printer/plotter models, though with different mounting holes in some instances. It can be conventionally made from standard blanks, trimming and tooling the ends and stamping the holes, almost entirely eliminating the need for special jigs and tooling in manufacture.

Even with the attached scale, the heavier-gauge strip greatly reduces the need for awkward handling to avoid breakage in assembly and test. (It is also feasible in principle to use instead a tension-bearing strip of another adequately creep-resistant material. With some materials, edges can be inexpensively formed in a bead to still further diminish the likelihood of injury. Such alternative material might for example be of glass or metal fibers, or the material known commercially as Kevlar®; or might itself be a composite.)

It is also preferred that the scale be substantially transparent, and mounted so that at least part of each of its indicia projects physically beyond one substrate edge for transmission therethrough of an optical sensing beam. This arrangement obviates any need of perforating the metal scale, except for mounting holes at its ends, thereby achieving a considerable economy.

Preferably the scale is secured to the substrate by adhesive—with some difference in mounting position along the substrate, for different models. Like the substrate, the scale can be made in just one version, and we have found it particularly economical to standardize the length—making the scale longer than needed for at least some of the installations. To minimize the influence of end effects (in scale manufacture) on product performance, our standard scale has some graduations that are not actually used for carriage positioning in any product model.

Preferably the invention in its first aspect also encompasses some means for holding the substrate tensioned. These means are defined on the chassis, and in this document for purposes of generality and breadth will be called simply the "mounting means".

The invention also includes some means for reading the indicia. These means are fixed to the carriage, and again for breadth and generality will be called the "optical sensor means".

The system preferably also includes the chassis, the carriage, and some means for driving the carriage across the chassis—the "driving means". In addition the system includes some means for controlling the driving means to establish position and speed of the carriage with respect to the chassis. We will call these means the "control means"; they are responsive to the optical-sensor means.

It is furthermore preferred that the system include some means, responsive to the optical sensor means, for operating the mark-forming-or-sensing apparatus in coordination with the controlling means. These components work together to form or sense marks on the sheet at positions established, with respect to the chassis, by the controlling means.

In preferred embodiments of a second of its aspects, as in preferred embodiments of the first, the invention is a position encoding system for a large-format automatic image-related device. Also as before, the device has a chassis for supporting an image-bearing sheet and has a carriage which scans across the chassis carrying apparatus for forming or sensing marks on the sheet.

In this second aspect of the invention, the encoding system includes some means for supporting the carriage and driving the carriage across the chassis in a scanning direction. These will be called the "supporting and driving means".

The system also includes an aperture defined, along the scanning direction, in the carriage. In addition the system includes an elongated encoder-strip substrate that is threaded through the aperture, along the scanning direction, and fastened to the chassis.

Further included is an elongated polymeric encoder-strip scale secured to the substrate and threaded therewith through the aperture. The scale has indicia exposed for use in determining such carriage position with respect to the chassis.

The foregoing may constitute a description or definition of the second facet of the invention in its broadest or most general form. Even in this general form, however, it can be seen that this aspect of the invention too significantly mitigates the difficulties left unresolved in the art.

In particular since the substrate and scale are secured together, and threaded together through the carriage aperture, the polymeric scale is ideally situated for reading by a sensor system carried on the carriage—while the structural/optical duties of the codestrip are advantageously divided between the substrate and scale, generally as in the first aspect of the invention.

Although this second aspect of the invention in its broad form thus represents a significant advance in the art, it is preferably practiced in conjunction with certain other features or characteristics that further enhance enjoyment of overall benefits.

For example, it is preferred that the scale be substantially transparent, and mounted so that at least part of each of its indicia projects physically beyond one substrate edge for transmission therethrough of an optical sensing beam. The system then further includes optical sensor means, fixed to the carriage, for reading the indicia; and the sensor means are immediately adjacent to the aperture and very closely spaced with the scale.

In this case preferably the sensor means include a source of electromagnetic radiation disposed at one side of the aperture and very closely spaced with the scale, and a sensor disposed at an opposite side of the aperture and also very closely spaced with the scale. In addition the system includes some means, responsive to the optical sensor means, for controlling the carriage-driving means to establish position and speed of the carriage with respect to the chassis.

This system also preferably includes some means, responsive to the optical sensor means, for operating the mark-forming-or-sensing apparatus in coordination with the controlling means; this operating proceeds so as to form or sense marks on the medium at positions established, with respect to the chassis, by the controlling means. In addition, the preferences mentioned earlier for the first aspect of the invention are applicable here too—e. g., preferably the substrate is a thin piece of metal and the system includes means (such as described earlier) for guarding the thin edges.

In preferred embodiments of a third basic aspect or facet, the invention is related to the preferred embodiments of the first two aspects in being a position encoding system for a large-format automatic image-related device. This system is also related to the first two in that the device has a chassis for supporting an image-bearing sheet, and has a carriage which scans across the chassis carrying apparatus for forming or sensing marks on the sheet.

The position encoding system includes an elongated metal encoder-strip substrate with two ends secured at opposite sides of the chassis, and an elongated encoder-strip scale secured to and supported by the substrate. At all points intermediate to the two ends of the metal substrate, in this third aspect of the invention, the scale is without direct support by the chassis. The scale has indicia exposed for use in determining the carriage position with respect to the chassis.

This may be a broad definition or description of preferred embodiments of the third aspect of the invention. Even as thus broadly conceived, this facet of the invention may be seen to significantly advance the art relative to the apparatus known heretofore.

In particular the absence of direct chassis support to the scale provides an opportunity for distribution of scale support along the substrate to which the scale is secured. Such distributed support frees the substrate from restrictions due to the mechanical or structural requirements of the art, so that its material of construction may be chosen as convenient.

Nevertheless we do prefer to use this aspect of the invention in conjunction with certain additional features or characteristics that tend to optimize enjoyment of the benefits of the invention. For example we prefer that the metal substrate be, except at its two ends, unperforated; and that substantially no functioning codestrip indicium be formed directly on the metal substrate.

In preferred embodiments of a fourth of its aspects, the invention is not a system but rather a position encoding method, for use in a large-format automatic image-related device. The device has a chassis for supporting an image-bearing sheet and has a carriage which scans across the chassis, carrying apparatus for forming or sensing marks on the sheet.

The device also has means for driving the carriage across the chassis in a scanning direction; and has an aperture defined, along the scanning direction, in the carriage. The device additionally has a composite encoder strip that includes a scale, made of a substantially transparent material, secured to an opaque substrate.

The position encoding method includes the step of threading the composite encoder strip through the aperture, along the scanning direction. It furthermore includes the step of pulling the composite encoder strip taut by applying to the substrate a tension that exceeds a functional failure value for the scale considered alone.

By a "functional" failure value is not necessarily meant a value that would lead to gross mechanical failure of the scale. Tension that would lead to unacceptable levels or rates of creep suffices to satisfy our criterion of functional failure.

The method also includes the step of operating the carriage-driving means—to scan the carriage across the chassis while the encoder-strip substrate remains threaded through the aperture. Still another step is reading the scale, during the operating step, by projecting a sensor beam directly through the scale material to determine position of the carriage.

The foregoing may constitute a description of the method aspects of our invention in their broadest or most general form. Even in this form it is explicit in this definition that the composite strip is tensioned beyond the ability of the scale alone to function, and that the strip is threaded through the carriage to enable use of an optimum very short optical path.

Still we prefer to practice this method with certain further features or characteristics to maximize its advantages. For instance, preferably the scale-reading step comprises projecting the sensor beam through the scale material along a path that does not intersect the substrate.

Preferably the projecting step comprises directing the sensor beam through the scale material in a region of the composite codestrip in which the substrate is not perforated.

We prefer that the operating step include scanning the carriage through a distance exceeding thirty centimeters (twelve inches) across the chassis. We also prefer that the pulling and operating steps include using the substrate to stabilize the scale dimensionally to a precision of roughly one twelfth of a millimeter (one three-hundredth of an inch) substantially independent of humidity and temperature and substantially without creep.

In preferred embodiments of a fifth and a sixth of its aspects, the invention is a family of at least two position encoding systems. It is for use in a corresponding family of at least two large-format automatic image-related devices.

Each of the image-related devices (which are the context or environment of the invention) has a chassis for supporting an image-bearing sheet. Each of the devices also has a carriage which scans across the chassis, carrying apparatus for forming or sensing marks on the sheet.

The family of position encoding systems includes, in each position encoding system, a respective elongated metal encoder-strip substrate. The substrate has two ends secured at opposite sides of the chassis.

The family of position encoding systems also includes, in each position encoding system, a respective elongated polymeric encoder-strip scale secured to the substrate and supported thereby. The scale has indicia exposed for use in determining the carriage position with respect to the chassis.

Still with reference to the fifth and sixth aspects of the invention, the scale and substrate are differently disposed in relation to each other, in the at least two position encoding systems.

Now in the fifth broad aspect of the invention, the substrates in at least two of the position encoding systems are identical to each other. In the sixth aspect of the invention, the scales in at least two of the position encoding systems are identical to each other.

The foregoing description of the fifth and sixth broad facets or aspects of the invention will make clear that the invention is capable of using standardized or partly standardized scales and substrates. This capability, and the capability to mix and match these standard or partly standard components, has not previously been possible with ultrahigh-quality codestrips for large-format machines.

This benefit is of extremely great economic importance in the field of large-format carriage-scanning image-related devices. Various preferences in regard to these facets of the invention will appear—among them a preference for making, in some families of encoding systems, both (1) the substrates identical to each other and (2) the scales identical to each other.

All of the foregoing operational principles and advantages of the present invention will be more fully appreciated upon consideration of the following detailed description, with reference to the appended drawings, of which:

BRIEF DESCRIPTION OF THE DRAWINGS

FIGS. 13, 14 and 15 considered together represent a family of encoding systems having identical scales; and FIGS. 13, 15 and 16 considered together represent a family of encoding systems having identical substrates.

DETAILED DESCRIPTION OF THE PREFERRED EMBODIMENTS

Figure 1:
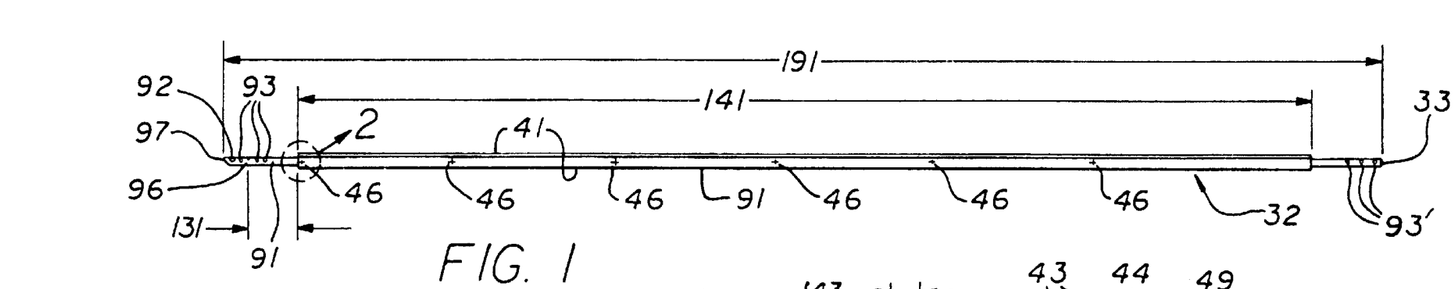
FIG. 1 is a front elevation of a preferred embodiment of the composite codestrip according to the invention.
Figure 2:
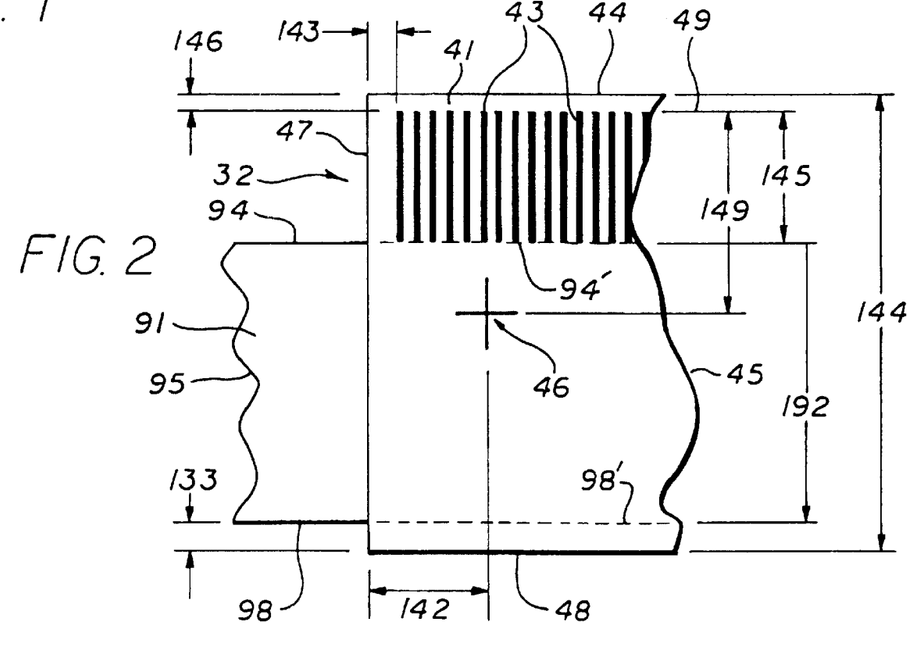
FIG. 2 is a like view of the FIG. 1 embodiment, but very greatly enlarged and showing only the region enclosed within the line 2—2 in FIG. 1.
Figure 3:
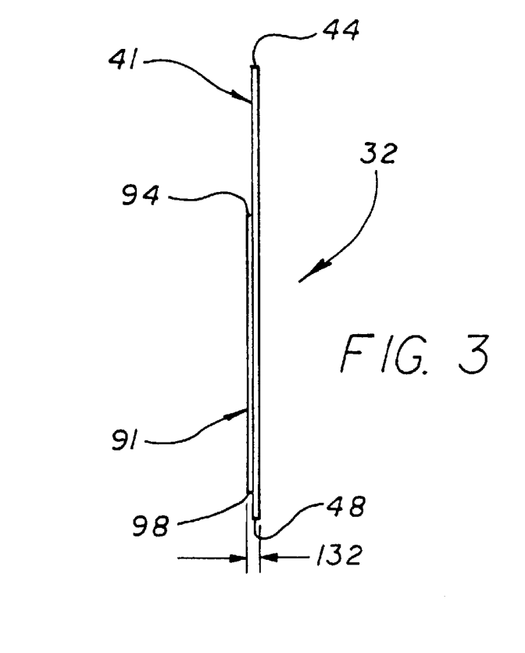
FIG. 3 is a left-end elevation of the same embodiment and at the same enlargement as FIG. 2.

FIGS. 1 through 3 show that in preferred embodiments of our invention the polymeric film scale 41 and the metal substrate 91 form an assembly 32. We prefer to glue them together with the substrate 91 behind the scale 41, using an acrylic adhesive (3M Scotch® 467 Laminating Adhesive) which tends to resist creasing due to thermal effects.

The adhesive, initially in sheet form, is cut in strips by the vendor to match the size of the desired interface between substrate and scale, and then placed on the plastic—held by vacuum until assembly is complete.

The scale 41 is of a photosensitive polyester-base antistatic film, with the graduations 43 formed photographically in the rear face. It projects both above and slightly below the substrate.

That is to say, the top and bottom edges 44, 48 of the scale 41 are respectively above and below the corresponding edges 94, 98 of the substrate 91. This geometry exposes the graduations 43 for light transmission through the scale 41 unidirectionally (i. e., without reflection at the substrate surface).

The plastic edges 44, 48 are roughly twice as thick as the metal edges 94, 98 and much more compliant, thus serving to guard the thin metal edges against contact by personnel. Furthermore, since it is no longer necessary to etch orifices in the metal substrate 91, it can be made twice as thick as the original all-metal codestrip of Wilcox and Milkovitz—thus even further reducing the possibility of injury, while adding to the rotational and positional stability of the assembly.

If desired, one or both edges 44, 48 of the plastic scale 41 could be formed in a bead, for still further protection. Our observations suggest, however, that the plastic projections with simple straight edges are not sharp enough to cause significant harm, and also—due to the appearance of the black graduations against the transparent scale—are far more conspicuous than the metal edges of the prior all-metal strip with only its uncolored, very fine orifices.

We prefer that the graduations be formed on the photosensitive film using a laser plotter which writes to the film in a longitudinally progressive manner along the scale, with autocompensation for error along the way. As compared with an overall single-exposure method, this process tends to produce about the same overall variation but much better (slower) drift.

FIG. 2 shows an area (2—2 in FIG. 1) at the left end 47 of the scale 41. The codestrip 32 is drawn broken away at 45 to enable showing of this area at a high enlargement. As this drawing and FIG. 1 both indicate, the substrate 91 extends leftward well beyond the left end 47 of the scale, to a group of mounting and datum holes 92, 93. The substrate 91 also extends rightward beyond the right end of the scale, to a second group of three mounting holes 93' (FIG. 1).

When the scale 41 is assembled to the substrate 91, the bottom ends of all the photographically formed graduations 43 are nominally aligned, as shown, with the upper edge 94' (FIG. 2) of the substrate 91—where the substrate 91 passes behind the scale 41. This alignment has been found advantageous to optimize readability of the scale under all adverse accumulations of tolerance, particularly under vibration.

Formed photographically in the scale 41, at the same time as the graduations 43, is a set of six optical crosshairs 46. These are partly for convenience in visually finding particular graduations which are to be used in performing certain quality-control tests, as will be explained below.

Figure 4:
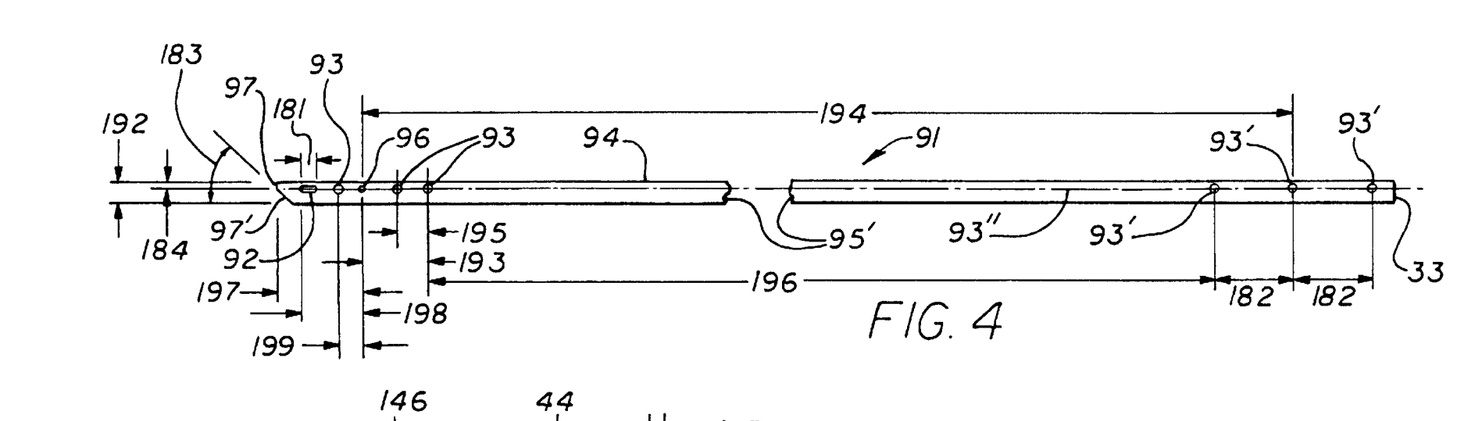
FIG. 4 is a front elevation of the substrate alone, for the FIG. 1 embodiment.

In addition the leftmost one of the crosshairs 46 serves as an alignment mark for positioning the scale 41 with respect to a datum feature 96 of the substrate 91. As FIG. 4 shows more clearly, that feature 96 is a small circular hole, spaced in from the left end 97 of the substrate 91.

Also formed in the substrate 91 near that end 97 are a mounting slot 92 and three mounting holes 93; near the right end 33 of the substrate 91 are three additional mounting holes 93'. These and other mounting features in essence approximate earlier interfacing of the codestrip 91 to the mounting hardware associated with the chassis, to minimize cost of changeover and also to facilitate retrofit of earlier units if desired.

Our invention is incorporated into, or in respect of certain of the appended claims constitutes, a large-format image-related device 11–15 (FIG. 7), which may be a printer/plotter or scanner. The chassis of the device is advantageously housed within two separated cabinets 12, 13 interconnected by a transparent cover 11.

Figure 7:
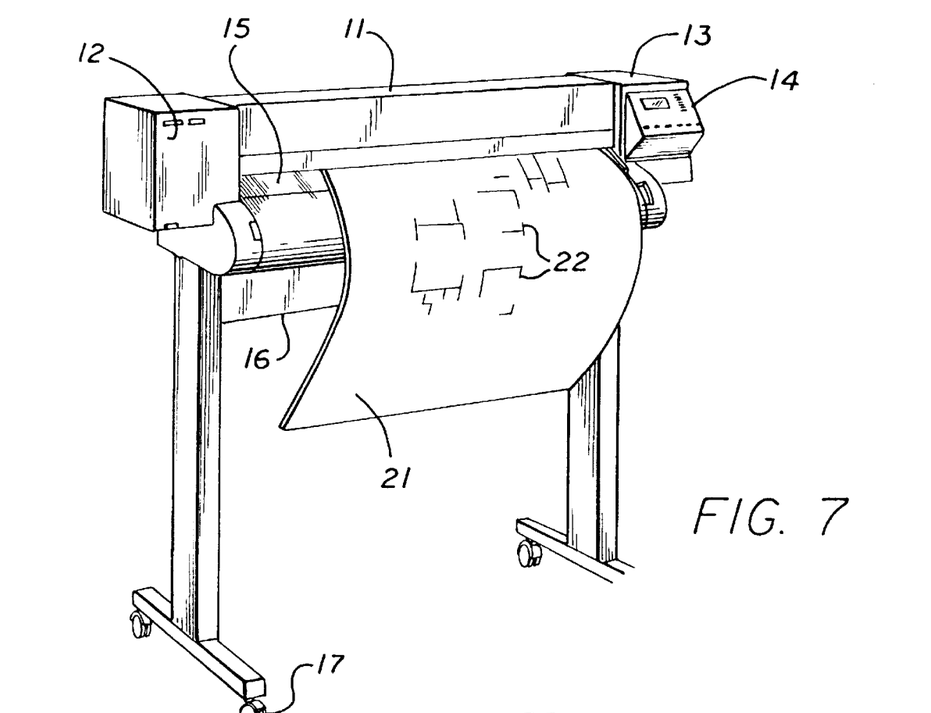
FIG. 7 is a perspective or isometric view of a large-format image-related device (printer/plotter or scanner) incorporating the invention.

A control panel 14 is provided on one cabinet 13, and a slot 15 is provided beneath the front panel of the cover 11 for issuance of an image-bearing sheet 21—which carries the image 22 being formed or read by the device 11–15. Advantageously the entire device 11–15 is carried on an elevated cart 16 with wheels 17.

Portions of the chassis form mounts 58, 59 (FIG. 8) for securing the two opposite ends 97, 33 of the composite codestrip assembly 32 into the device. Before completion of this attachment, however, the assembly 32 is threaded through an aperture 61' in a carriage 61.

Figure 8:
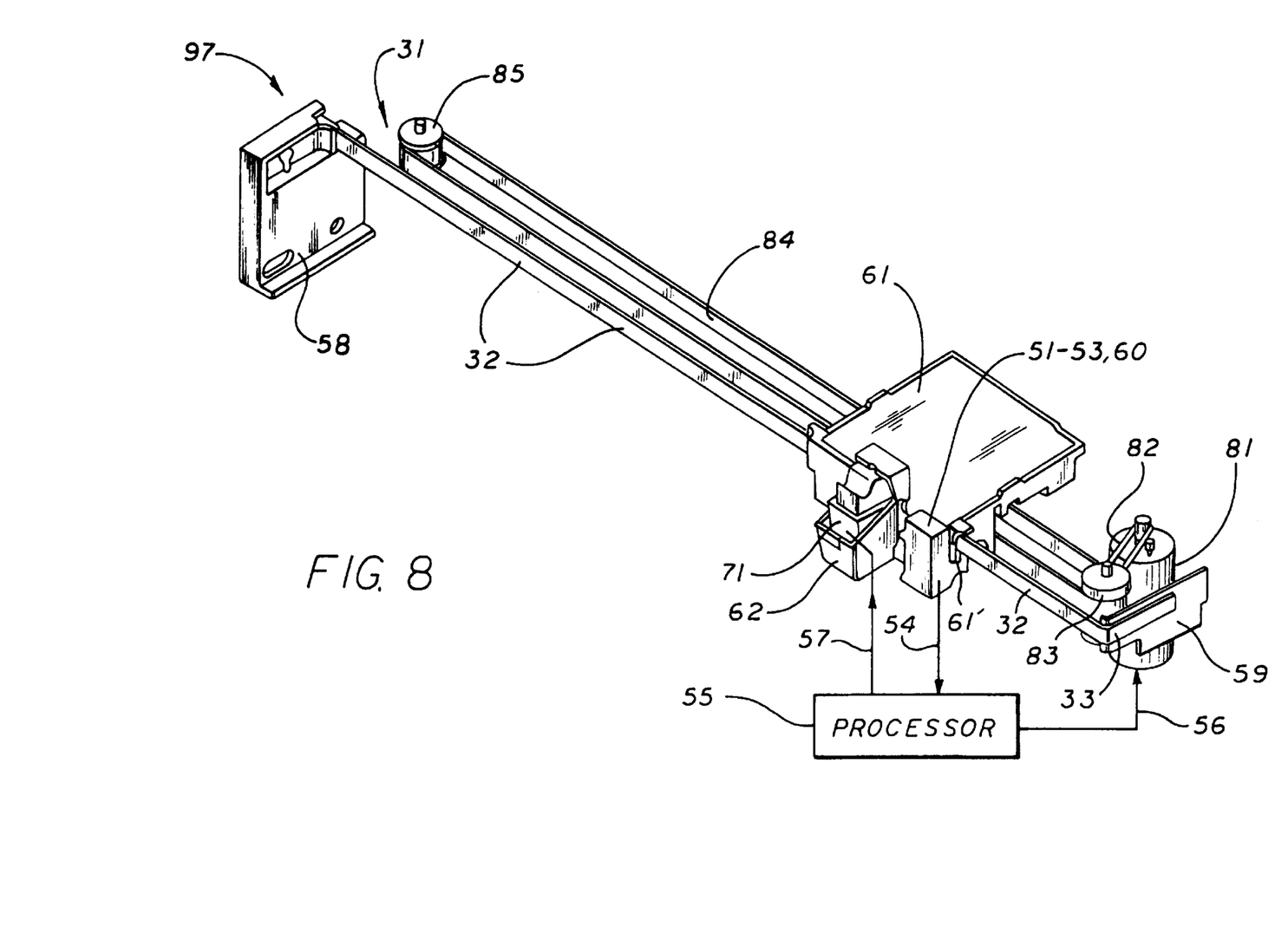
FIG. 8 is a like view, but enlarged, showing a generic working assembly, within the FIG. 7 device, that includes the image transducer (e. g., pen or other marking implement, or scanning head), carriage, drive, optical sensor, and codestrip for the FIG. 7 device—and also showing very schematically in block-diagrammatic form the application of the sensor signals to control the transducer and scan drive.

For transverse scanning, the carriage 61 is slidably supported on a bar (not shown) that extends generally between the mounts 58, 59. The carriage 61 is driven along the bar by a motor 81, through an endless-loop transfer belt 82, a drive pulley 83 near one mount 59, and a transverse belt 84, also endless and fixed to the carriage 61. Near the opposite mount 58, the transverse belt 84 passes around an idler pulley 85.

The carriage 61 includes a stall or tray 62 for holding an image transducer 71, which may be either an array of image sensors or an image-forming device such as an inkjet pen. Also mounted to the carriage 61 is a sensing system 51–53 (with its case 60) for reading the graduations on the codestrip 32.

The previously mentioned carriage aperture 61' passes through the case 60 of the sensing system 51–53. As with the prior all-metal codestrip, the present invention enables advantageous achievement of a very short offset D (FIG. 9) between the codestrip 32 and the writing or reading elements 72 of the image transducer 71.

Figure 9:
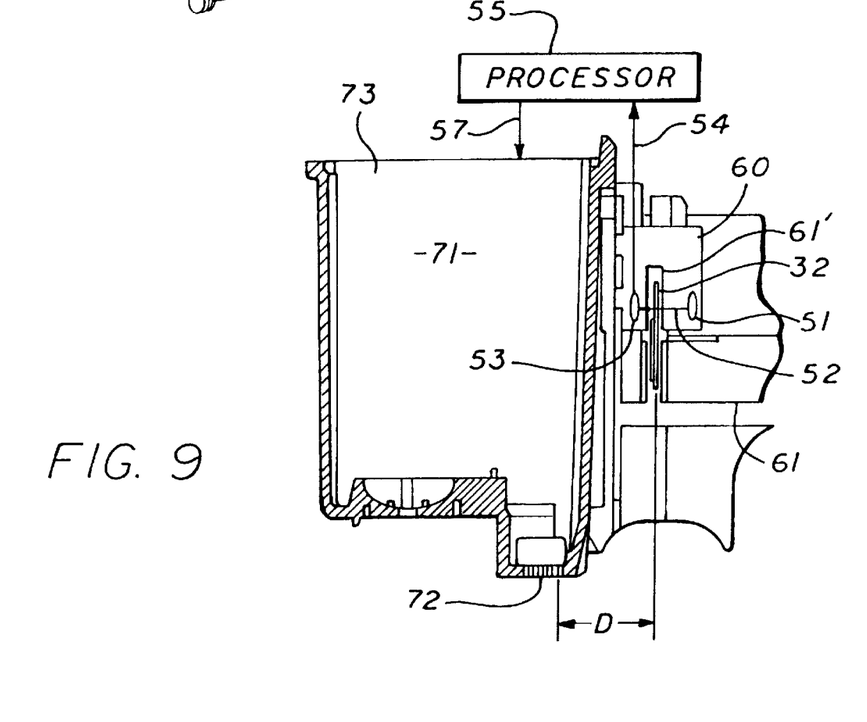
FIG. 9 is a right-end cross-sectional elevation of the pen, carriage, and codestrip—similarly showing very schematically the optical sensing system and the application of its output signals to control the pen.

The sensing system within the case 60 includes an optical source 51, optical beam 52 passing through the codestrip assembly 32, and detector or sensor 53. Graduations 43 of the codestrip 32 cause light reaching the detector to be alternately obstructed and transmitted, as the carriage 61 and its light beam 52 pass along the stationary strip 32.

The detector 53 responds to the resulting variations in received light with a correspondingly varying electrical signal 54, directed to a programmed digital electronic microprocessor 55. This processor 55 is part of a central processor system in the device 11–15, programmed to operate and control the entire device.

The processor 55 interprets the position signals 54, counting them and developing from them information not only about position but also about velocity of the carriage 61 along its path between the opposite chassis mounts 58, 59. The processor responds with control signals 56, 57 directed to both the drive motor 81 and the image forming or sensing device, or image transducer, 71.

Signals 56 to the motor 81 stabilize and maintain the velocity of the motor 81—based on the informational feedback derived from the position signals 54—while the carriage 61 traverses the image area of the sheet 21. The signals 56 reverse the motor 81 when the carriage is in or beyond the margins of the sheet 21.

Signals 57 to the image transducer 71, particularly if it is an image-forming device such as a pen, induce that device to form marks 22 on the sheet 21 at accurately determined positions analogously derived from the position signals 54. If the image transducer 71 is an image-sensing device such as an array of sensors, the signals 57 may control excitation of the sensors or provide other functions, depending upon the type of sensor in use and other characteristics of the system.

Other mechanical features and characteristics of our composite codestrip 32 are sufficiently close to those of the earlier all-metal strip to provide excellent backward compatibility, in particular preserving the general mechanical requirements on the original chassis mounts 58, 59. These features and characteristics include:

the approximate overall height and length of the codestrip 91 as an assembly (equal to the height 144 of the scale 41, and length 191 of the substrate, respectively), and the dimensional relations between the centerline 49 (FIGS. 2 and 6) of the graduations 43 in the scale 41 and the centerline 93" of mounting holes 92, 93, 93' in the substrate 91.

One feature of our composite codestrip 91 which is quite different from that of the prior codestrip is the overall thickness 132 (FIG. 3) of the composite assembly 91: nearly six times that of the prior all-metal codestrip. In the geometrical worst case, within our preferred configuration, there is a small but nonnegligible probability of the assembly 91 touching the surface of the carriage aperture 61'.

To avoid problems, in such a case, of the sensor rubbing against the scale and thereby damaging the graduations, we prefer to mount the scale with the graduations facing toward the rear of the assembly—in other words, toward the side that is secured to the metal substrate. In this configuration the outwardly extending thickness of the substrate tends to protect the graduations themselves against such contact.

To preserve the clearance it is also important that residual adhesive be removed when the composite codestrip 91 is assembled. Adhesive pieces that could fall off or obstruct operation must not be allowed at either side of the assembly. We have found this to be particularly critical along the edges 94' (FIG. 2) of the substrate 91 that are directly adjacent to the surface of the scale 41.

In this simple geometry—with the scale graduations entirely beyond the edge of the substrate—there is no need for reflection of an optical beam at the substrate surface, and no need for forming a slot or window in the substrate. The scale is sufficiently stiff that it maintains its position relative to the aperture in the carriage, and thus with respect to the optical path of the sensor.

As will be clear to those skilled in the art, however, other configurations utilizing reflection or a slot have their respective advantages and are well within the scope of our invention as defined in certain of the appended claims. Interestingly, we use the same composite strip in one orientation—with the plastic scale extending upward, for example, from the metal substrate—in certain installations, and in the opposite orientation with the scale extending downward in others.

This dual functionality accommodates varying architecture of sensor and carriage details. Whereas the earlier metal strip was about thirteen millimeters wide, with mounting holes near or on the longitudinal centerline, in the present invention the holes—while still near the overall system centerline—are near the edge of the metal substrate.

Figure 13:
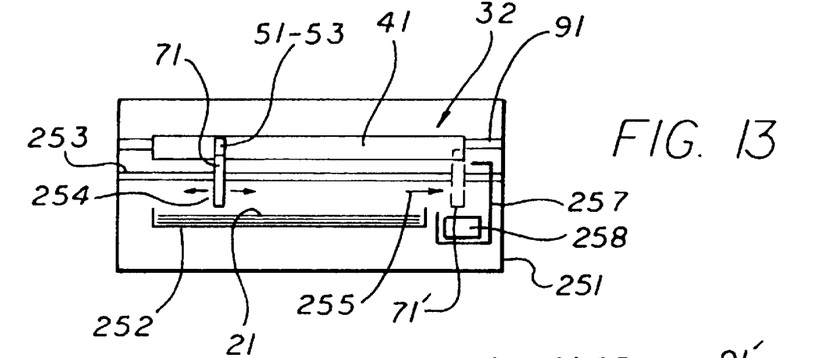
FIGS. 13 through 16 are very schematic showings of several families of position encoding systems, each diagram being an elevation of components within a machine case or chassis. Each encoding system is illustrated in the context of a different respective large-format image-related device—the various members of each family having highly beneficial interrelationships. Each of these drawings represents one member of the families of systems.
Figure 14:
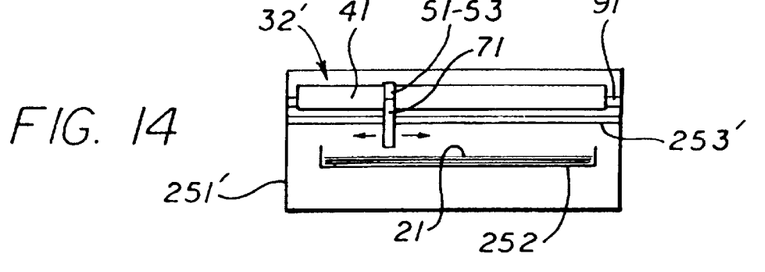
Figure 15:
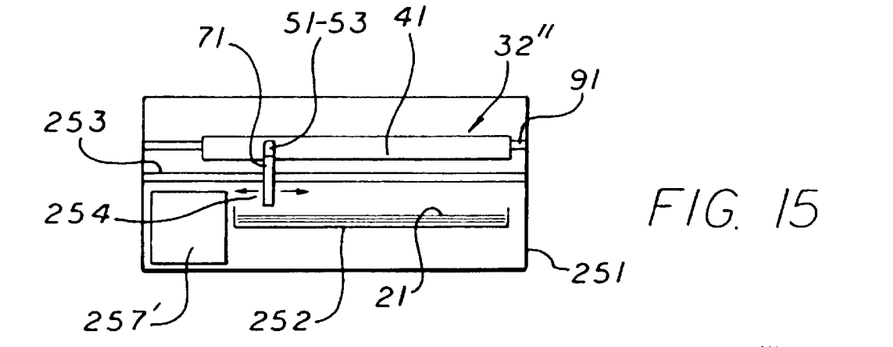

As shown in FIGS. 13 through 15, an identical scale 41 can serve in many quite different image-related devices. FIG. 13, for example represents a device with a wide chassis 251 to accommodate a chassis module 252 which holds sheets or rolls of printing medium 21 that is moderately wide.

In FIG. 13 the pen 71 is carriage-mounted for bidirectional movement 254 along a scan support bar 253 for printing—and also for motion 255 into an alternative position 71' within an auxiliary pen service-station module 257 that includes specialized equipment 258 for pen-related functions such as for example priming, cleaning, testing for ink ejection, ink-ejection recovery in case of partial failure, etc.

Riding with the pen 71 is a sensor assembly 51–53 including light source 51 (FIG. 9), optical path 52 and optical detector 53. The sensor assembly 51–53 interacts with the scale 41 to provide positional information; to enable this interaction within the particular geometrical constraints of the FIG. 13 image-related device, as shown the composite codestrip assembly 32 is mounted with the scale 41 depending or extending downward from the substrate 91.

FIG. 14 shows a much more modest and economical image-related device, with narrower and shallower chassis 251', shorter scan support bar 253' and substrate 91', and no pen service station. The scale 41, however, is identical to that of FIG. 13—as may be the paper-holding component 252 of the chassis, the moderately wide paper 21, pen 71, and the sensor 51–53.

In FIG. 14 the scale 41 itself is identical but inverted, in other words mounted upside-down, with respect to the scale 41 of FIG. 13: the composite codestrip assembly 32 is mounted with the scale 41 projecting or extending upward from the substrate 91. This orientation better accommodates the particular geometrical constraints of the FIG. 14 image-related device.

In view of all the differences mentioned, it will be apparent that the composite encoder strip assembly 32' of FIG. 14 is quite distinct from the assembly 32 of FIG. 13. Nevertheless in the FIG. 14 device the sensor assembly 51–53 interacts with the scale 41 to provide positional information substantially as in the FIG. 13 device.

As shown in FIG. 15, variations employing an identical scale 41 may also entail use of an identical substrate 91, but different mutual disposition. FIG. 15 illustrates in particular that the scale 41 is mounted with a shift longitudinally along the substrate 91, relative to the FIG. 13 assembly 32, thereby producing still another composite codestrip assembly 32"—although the chassis 251, substrate 91, pen 71, sensor 51–53, scan support bar 253, and moderately wide printing-medium tray 252 can all be substantially identical to those of FIG. 13.

FIG. 15 suggests that the positioning of these elements within the chassis 251 is for accommodation of some other internal element 257'. That element may be of any character that impels the overall device designer to beneficially shift the operating locations of the printing-medium tray 252, etc., within the chassis.

Thus the flexibility and versatility of our novel composite codestrip assembly translate into corresponding flexibility and versatility for the designer in laying out the apparatus. This advantage is of very great economic importance.

Figure 16:
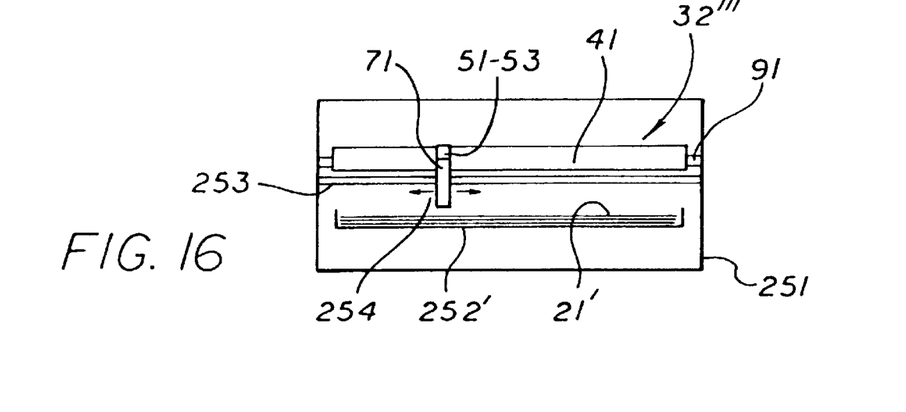

Still another variation appears in FIG. 16, which may use substantially identical chassis 251, scan support bar 253, substrate 91, pen 71 and/or sensor 51–53 as in FIGS. 13 and 15—but is able to accommodate a somewhat wider print-medium tray 252' and thus printing medium 21'. The print-medium width considerably exceeds that in the preceding figures, which was only moderate.

The scale 41' is substantially longer than in the configurations discussed above, to provide positional information over the greater length of pen travel required for the wider printing medium. Thus FIG. 16 shows still another composite codestrip assembly 32'"—distinct from those introduced earlier, though using a common substrate.

Whereas several specific variations have been shown in FIGS. 13 through 16, their purpose rather is to illustrate the invention broadly as position encoding system families, which can overlap. Thus in FIGS. 13 through 15 a family of systems with all identical scales appears; in FIGS. 13, 14 and 16 another with all identical substrates; and in FIGS. 13 and 15 systems that are common to the two families—in having both identical scales and identical substrates.

Accurate positioning of the graduations 43 relative to the substrate 91—and thus relative to the chassis 58, 59 and image-bearing sheet 21—is very important. In the prior all-metal strip, of course the graduations were formed integrally in the strip; we have therefore devoted considerable care to maintaining this very important positioning in the present composite construction.

Furthermore, while the dimensional integrity of the graduations 43 is beneficially stabilized by the metal substrate 91 once the two have been permanently assembled, until that moment the graduations 43 are susceptible to various kinds of deformations and corruption. We consider it very important to vigilantly test for such problems, and thereby weed out composite codestrips in which errors exceed tolerances.

In this regard, pitch variation between adjacent graduations 43 must be subject to a stringent maximum allowance. Even more critical is a specification on maximum variation from nominal distance for nonadjacent graduations 43—since these variations represent absolute error that is cumulative, and which the electronic logic system may not be able to detect or counteract.

We consider it advisable to inspect consecutive sets of several hundred graduations, in each of several regions of the codestrip. More particularly, the previously mentioned crosshairs are for identification of the starting points for five different inspection sequences.

We inspect consecutive sets of several hundred (225, 450, 1005 and 1215) graduations 43 each, starting at each of the first five crosshairs 46. These graduations are checked in overall-production quality control for nonadjacent-graduation distances. (Besides this inspection, adjacent-graduation pitch variation may be checked internally to the manufacturing process—as a way of monitoring the correctness of that process.)

To facilitate these inspections, in forming the indicia on the scale we align the left border of the vertical line of each crosshair with the left border of the corresponding graduation. This facilitates quick and correct identification, by inspection personnel or automatic apparatus, of the desired starting graduation for each measurement.

Figure 5:
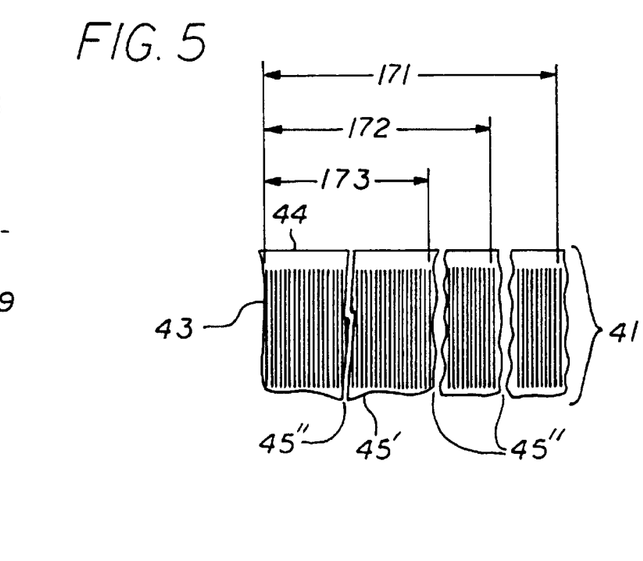
FIG. 5 is a front elevation of certain segments of the scale alone, for the same embodiment.

The numbers of graduations to be counted off from the starting crosshair, in each part of the test, are illustrated in FIG. 5 conceptually. (The reference numerals 171, 172, 173 merely identify groups of lines; they are not the actual numbers of lines in the groups. Actual representative numbers are tabulated later in this document.) This illustration is drawn broken away along the bottom 45' as well as at left and right—and also is interrupted at intermediate points 45"—to enable use of adequately great enlargement.

In FIG. 5, three nested groups 171, 172 and 173 of graduations are identified. For testing, we specify the number of graduations in each group and the correct distance across each group. (Of course FIG. 5 is only exemplary as to the number of groups checked.) In the test each specified number of graduations is counted off, and the distance across that group of graduations is measured and compared with the corresponding specified distance.

It is also important to define carefully, and scrupulously refer all measurements to, appropriate reference datum points. In our composite codestrip the master datum for both horizontal and vertical measurements is the center of the datum hole 96 (FIG. 4).

The mounting slot 92 and all the mounting holes 93, 93' are commonly aligned vertically on the horizontal centerline 93" of this datum hole 96. The slot 92 and mounting holes 93, 93', and the formed left end 97, 97' of the substrate, similarly are located along the lengthwise extent of the strip either directly or indirectly with respect to the vertical centerline of this hole 96.

For the substrate we use stainless steel, standard number 1.4310 or equivalent, with deburred finish. For the scale we prefer the polyester-base antistatic film material available commercially as Agfa® Starline™ RLS3.

Antistatic properties (generally specified in terms of the voltage per number of rubbing cycles) are important to minimize the effects of electrostatic charge buildup. Such static electrical charge can affect nearby electronics—and in an inkjet printing system can also introduce perturbing deflections of inkdrops in flight from pen toward printing medium.

The antistatic film, however, can only drain charge to the metal substrate. Therefore good grounding of the metal substrate to the chaassis mounts is also important.

Although the substrate of our invention is much more sturdy and resistant to damage than the prior all-metal strip, nevertheless successful practice of our invention calls for protecting the substrate against development of excessive local mechanical stresses—as for example by being bent too sharply at the mounting points. The prior patent of Wilcox and Milkovitz in FIGS. 17 through 19 introduces a springy metal plate that is used as one mount.

That plate included a stud for capturing a mounting hole in the codestrip, and had a smoothly curved way or track over which the all-metal codestrip passed, to avoid an excessively sharp bend. For best performance of, or as part of, our present invention we have refined this part—which we call an "encoder spring".

Figure 10:
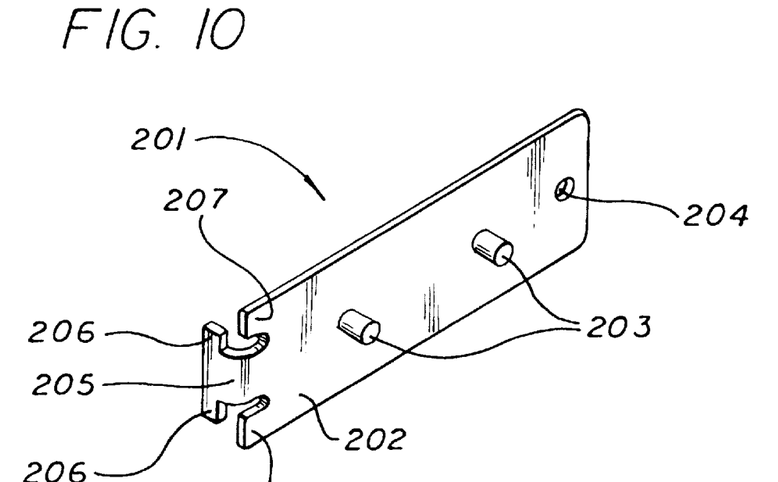
FIG. 10 is an isometric or perspective view of a mounting device used at one end of our invention and known as an encoder spring.
Figure 11:
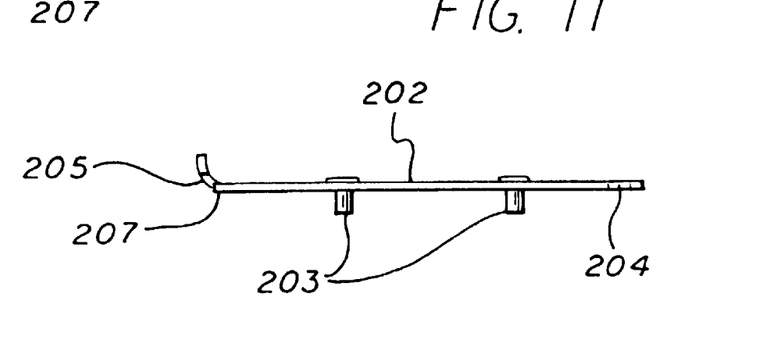
FIG. 11 is a plan of the FIG. 10 encoder spring.
Figure 12:
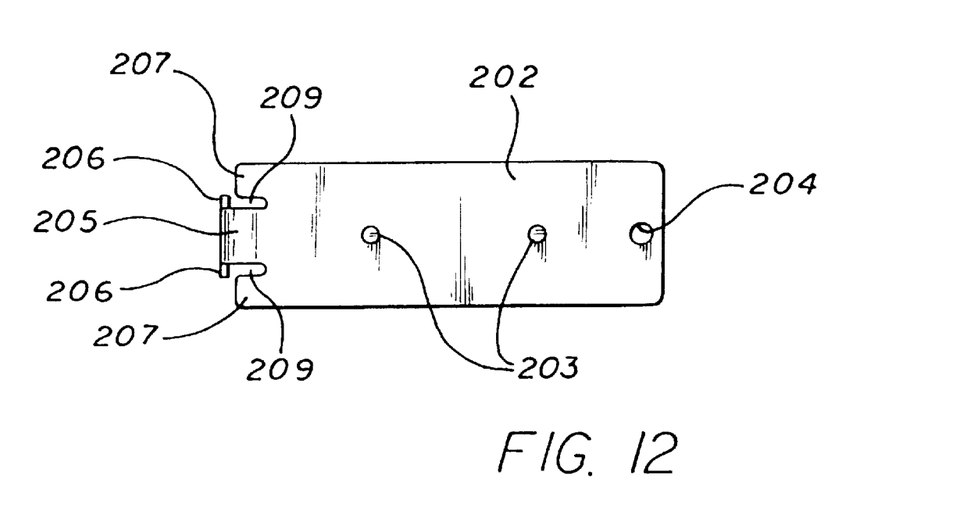
FIG. 12 is a front elevation of the same spring.

This new component 201, as shown in FIGS. 10 through 12, is made of stainless-steel plate 202 with two PEM studs 203 welded or brazed in place. The studs pass through two of the three mounting holes 93' near the right end of the substrate 91.

This subassembly 201 also includes—generally as before—a mounting hole 204, curved tongue 205 with broader tip 206, and unbent lateral ears 207 separated from the tongue by slots 209. The use of two studs 203, rather than only one, provides supplemental support to minimize bending of the substrate 91. The studs are spaced apart at the same spacing 182 (FIG. 4) as the corresponding mounting holes 93'.

The density of each graduation 43 should be great enough to ensure that the sensing system 51–53 will be able to respond unambiguously. We prefer to specify transmission of no more than two percent (minimum ninety-eight percent blockage), as measured with a light densitometer at average wavelength four hundred to seven hundred nanometers.

Figure 6:
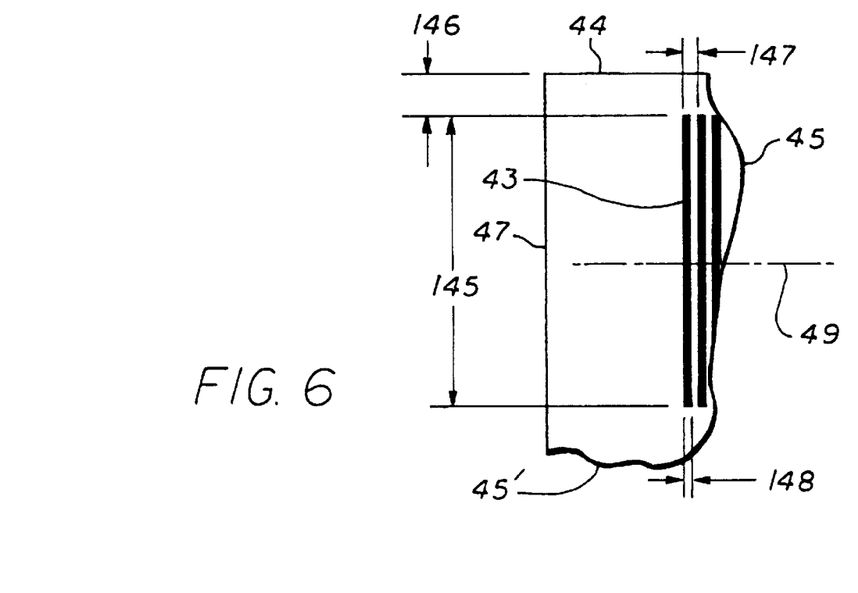
FIG. 6 is a front elevation of the upper-left corner of the scale alone, for the same embodiment.

Other specifications, as explained above, include these approximate values:

| MILLI-METERS | ELEMENT AND DIMENSION |
|---|---|
| | substrate 91 |
| 1,442 | length 191 |
| 8.0 | width 192 |
| 0.1 | thickness |
| 2.2 | diameter of datum hole 96 |
| 5.0 | length 181 of mounting slot 92 |
| 3.7 | diameter of first & second mounting holes 93 |
| 3.25 | diameter of third mounting hole 93, and of fourth and fifth mounting holes 93' |
| 2.2 | inset 184 of mounting-hole and -slot common centerline downward from top edge 94 of substrate 91 |
| 30.70 | offset 193 of third mounting hole 93 rightward from datum 96 (all hole positions stated to centerline) |
| 1,374.9 | offset 194 of fifth mounting hole 93' rightward from datum 96 |
| 10.9 | offset 195 of second mounting hole 93 leftward from third hole |
| 29.00 | offsets 182 of fourth and sixth mounting holes 93' respectively leftward and rightward from fifth hole 93' |
| 1,315.2 | offset 196 horizontally between third and fourth holes 93, 92' (reference only) |
| 30.6 | inset 198 of datum 96 from left end 97 of substrate 91 |
| 22.1 | offset 198 of left edge of mounting slot 92 from datum 96 |
| 8.6 | offset 199 of first mounting hole 93 leftward from datum 96 |
| | scale 41 |
| 1241 | length 141 |
| 13.0 | height 144 |

-continued

| MILLI-METERS | ELEMENT AND DIMENSION |
|---|---|
| 2 | height and width of each crosshair 46 |
| 0.1 | thickness of vertical and horizontal crossbars for each crosshair 46 |
| 3.54 | inset 142 of first crosshair 46 horizontally from left edge 47 of scale 41 |
| 1.0 | inset 143 of first graduation 43 horizontally from left edge 47 of scale 41 |
| 4.1 | common height 145 of graduations 43 |
| 0.2 | common inset 146 of tops of graduations 43 vertically from top edge 44 of scale 41 |
| 0.16933 | common period 147 (reciprocal of the pitch) of the graduations 43 |
| 0.003 | maximum permitted variation in the period 147 for adjacent graduations 43 |
| 0.0810 | common width 148 of graduations 43 |
| 6.28 | common offset 149 of horizontal crossbars of crosshairs 46 down from common top line 49 of graduations 43 |
| 205.74 | distance 171 across 1,215 graduations to right from each crosshair |
| 170.18 | distance 172 across 1,005 graduations to right from each crosshair |
| 76.20 | distance 173 across 450 graduations to right from each crosshair |
| 38.10 | distance across 225 graduations to right from each crosshair assembly 32 |
| 63.54 | offset 131 of first crosshair 46 rightward from the datum hole 96 |
| 0 | offset of the crosshair 46 horizontal bars vertically from the horizontal centerline of the datum hole 96 |
| 0.5 min. | inset 133 of the bottom edge of the substrate 91 vertically upward from the bottom edge 48 of the scale 41 (reference only). |

As to the cumulative measurements of distance across specified numbers of graduations, we prefer to allow no more than ±0.05% of the respective nominal values. We make all graduation-period and nonadjacent-graduation measurements with the codestrip under specified tension: for this condition we apply tensioning force of thirty-two Newtons, which is also the nominal operating tension for the assembly.

All dimensions and tolerances should be verified under specified atmospheric conditions. We use temperature of twenty-two degrees Celsius (plus two and minus three degrees) and relative humidity of fifty percent (plus or minus ten percent).

The bevel 97' of the lower-left corner of the substrate is at an angle of forty-five degrees.

The adhesive used for securing the scale and substrate together should be reasonably strong. To ensure this condition we test for it, using this procedure:

1) Tension the assembly to thirty-two Newtons.
2) Raise the assembly to seventy degrees Celsius and maintain for fourteen hours. Lower to zero degrees Celsius and maintain for six hours.
3) Cycle the assembly thermally for forty-eight hours between forty degrees below zero and seventy degrees above zero Celsius, with one hour of dwell at each extreme and rate of change one hundred ten degrees per hour.
4) Peel off the plastic strip at an angle of one hundred eighty degrees against the metallic strip, while at the same time verifying that the shearing force is at least one Newton.

In the bodies of certain of the appended claims the word "such" is used exclusively, and consistently, with elements of the context or environment of the invention as distinguished from elements of the claimed combination itself. This usage thus makes the claims much more specific and definite, with respect to indicating which features are part of the claimed combination and which are not, than if words like "the" and "said" were employed throughout.

The above disclosure is intended as merely exemplary, and not to limit the scope of the invention—which is to be determined by reference to the appended claims.

What is claimed is:

1. A position encoding system for use in positioning a carriage of a large-format automatic image-related device; said device having a chassis for supporting an image-bearing sheet and having a carriage which scans across the chassis, carrying apparatus for forming or sensing marks on the sheet; said position encoding system comprising:

an elongated encoder-strip substrate for tensioning across such chassis; and an elongated polymeric encoder-strip scale secured to the substrate for tensioning therewith across such chassis;

said scale having indicia exposed for use in automated reading thereof by such device, for determination of such carriage position with respect to such chassis.

2. The system of claim 1:

wherein the substrate is a thin piece of metal having a height, and having thin top and bottom edges; and further comprising means for guarding the thin edges.

3. The system of claim 1, wherein:

the scale is secured to the substrate by adhesive.

4. The system of claim 1, further comprising:

mounting means defined on such chassis for holding the substrate in tension.

5. The system of claim 4, further comprising:

optical sensor means, fixed to such mark forming or sensing apparatus, for reading the indicia.

6. The system of claim 5, further comprising:

such chassis;

such carriage next to the substrate and scale, on at least one side;

means, supported from the chassis, for driving the carriage across the chassis; and means, supported from the chassis and responsive to the optical sensor means, for controlling the driving means to establish position and speed of the carriage with respect to the chassis.

7. The system of claim 6, further comprising:

means, responsive to the optical sensor means, for operating such mark-sensing-or-forming apparatus in coordination with the controlling means to form or sense marks on such sheet at positions established, with respect to the chassis, by the controlling means.

8. A position encoding system for use in positioning a carriage of a large-format automatic image-related device; said device having a chassis for supporting an image-bearing sheet and having a carriage which scans across the chassis, carrying apparatus for forming or sensing marks on the sheet; said position encoding system comprising:

an elongated encoder-strip substrate that has a height, and has top and bottom edges, and is for tensioning across such chassis; and an elongated polymeric encoder-strip scale secured to the substrate for tensioning therewith across such chassis; and wherein:

the scale has indicia exposed for use in determining such carriage position with respect to such chassis, and is taller than the height of the substrate, and is mounted to overlap both edges of the substrate.

9. The system of claim 8, wherein:

the scale is substantially transparent, and is mounted so that at least part of each of its indicia projects physically beyond one substrate edge for transmission therethrough of an optical sensing beam.

10. A position encoding system for use in positioning a carriage of a large-format automatic image-related device; said device having a chassis for supporting an image-bearing sheet and having a carriage which scans across the chassis, carrying apparatus for forming or sensing marks on the sheet; said position encoding system comprising:

an elongated encoder-strip substrate for tensioning across such chassis; and an elongated polymeric encoder-strip scale secured to the substrate and for tensioning therewith across such chassis;

said scale having indicia exposed for use in determining such carriage position with respect to such chassis; and wherein the substrate is a thin piece of metal having a height, and having thin top and bottom edges; and further comprising means for guarding the thin edges; and wherein the guarding means comprise:

a height of the polymeric scale that exceeds the height of the substrate; and mounting of the polymeric scale to extend above the top edge of the substrate and below the bottom edge of the substrate.

11. A position encoding system for use in positioning a carriage of a large-format automatic image-related device; said device having a chassis for supporting an image-bearing sheet and having a carriage which scans across the chassis, carrying apparatus for forming or sensing marks on the sheet; said position encoding system comprising:

an elongated encoder-strip substrate for tensioning across such chassis; and an elongated polymeric encoder-strip scale secured to the substrate and for tensioning therewith across such chassis;

said scale having indicia exposed for use in determining such carriage position with respect to such chassis; and wherein:

the substrate has two edges; and the scale is substantially transparent, and is mounted so that at least part of each of its indicia projects physically beyond at least one substrate edge for transmission therethrough of an optical sensing beam.

12. A position encoding system for a large-format automatic image-related device; said device having a chassis for supporting an image-bearing sheet and having a carriage which scans across the chassis, carrying apparatus for forming or sensing marks on the sheet; said position encoding system comprising:

means, supported from such chassis, for supporting such mark forming or sensing apparatus and driving such carriage across such chassis in a scanning direction;

an elongated encoder-strip substrate for threading through such carriage, along the scanning direction, and for fastening to such chassis; and an elongated polymeric encoder-strip scale secured to the substrate and for threading therewith through such carriage;

said scale having indicia exposed for use in automated reading thereof by such device, for determination of such carriage position with respect to such chassis.

13. The system of claim 12:

wherein the substrate is a thin piece of metal having a height, and having thin top and bottom edges; and further comprising means for guarding the thin edges.

14. A position encoding system for a large-format automatic image-related device; said device having a chassis for supporting an image-bearing sheet and having a carriage which scans across the chassis, carrying apparatus for forming or sensing marks on the sheet; said position encoding system comprising:

means for supporting such mark forming or sensing apparatus and driving such carriage across such chassis in a scanning direction;

an elongated encoder-strip substrate for threading through the aperture, along the scanning direction, and for fastening to such chassis; said substrate being a thin piece of metal having a height, and having thin top and bottom edges; and an elongated polymeric encoder-strip scale secured to the substrate for threading therewith through such carriage; said scale having indicia exposed for use in determining such carriage position with respect to such chassis; and further comprising means for guarding the thin edges, wherein the guarding means comprise:

a height of the polymeric scale that exceeds the height of the substrate; and mounting of the polymeric scale to extend above the top edge of the substrate and below the bottom edge of the substrate.

15. The system of claim 14, wherein:

the scale is substantially transparent, and mounted so that at least part of each of its indicia projects physically beyond one substrate edge for transmission therethrough of an optical sensing beam.

16. The system of claim 15, further comprising:

optical sensor means, fixed to such carriage, for reading the indicia; and said sensor means being immediately adjacent to the aperture and very closely spaced with the scale.

17. The system of claim 16, wherein the sensor means comprise:

a source of electromagnetic radiation disposed at one side of the aperture and very closely spaced with the scale; and a sensor disposed at an opposite side of the aperture and very closely spaced with the scale; and means, responsive to the optical sensor means, for controlling the carriage driving means to establish position and speed of the carriage with respect to the chassis.

18. The system of claim 17, further comprising:

means, responsive to the optical sensor means, for operating the carriage driving means in coordination with the controlling means to form or sense marks on such sheet at positions established, with respect to the chassis, by the controlling means.

19. A position encoding system for a large-format automatic image-related device; said device having a chassis for supporting an image-bearing sheet and having a carriage which scans across the chassis carrying apparatus for forming or sensing marks on the sheet; said position encoding system comprising:

an elongated metal encoder-strip substrate that has two ends for securing at opposite sides of such chassis; and an elongated polymeric encoder-strip scale secured to the substrate and supported thereby;

said scale being, at all points intermediate to the two ends of the substrate, for use without direct support by the chassis; and said scale having indicia exposed for use in automated reading thereof by such device, for determination of such carriage position with respect to such chassis.

20. The system of claim 19, wherein:

the metal substrate is, except at its two ends, unperforated; and substantially no functioning codestrip indicium is formed directly on the metal substrate.

21. A position encoding method for use in a large-format automatic image-related device; said device having a chassis for supporting an image-bearing sheet and having a carriage which scans across the chassis, carrying apparatus for forming or sensing marks on the sheet; and having means for driving the carriage across the chassis in a scanning direction; and having an aperture defined, along the scanning direction, in the carriage; and having a composite encoder strip that includes a scale, made of a substantially transparent material, secured to a substrate; said position encoding method comprising the steps of:

threading the composite encoder strip through the aperture, along the scanning direction;

pulling the composite encoder strip taut by applying to the substrate a tension that exceeds a functional failure value for the scale considered alone;

operating the carriage driving means to scan the carriage across the chassis while the encoder-strip substrate remains threaded through the aperture; and reading the scale during the operating step by projecting a sensor beam directly through the scale material to determine position of the carriage.

22. The method of claim 21, wherein:

the scale-reading step comprises projecting the sensor beam through the scale material along a path that does not intersect the substrate.

23. The method of claim 22, wherein:

the projecting step comprises directing the sensor beam through the scale material in a region of the composite encoder strip in which the substrate is not perforated.

24. The method of claim 21, wherein:

the operating step comprises scanning the carriage through a distance exceeding thirty centimeters (twelve inches) across the chassis; and the pulling and operating steps comprise using the substrate to stabilize the scale dimensionally to a precision of roughly one twelfth of a millimeter (one three-hundredth of an inch) or better, substantially independent of humidity and temperature and substantially without creep.

25. The method of claim 21:

further comprising the step of, before the threading step, providing the composite encoder strip; and wherein the threading, pulling and operating steps comprise supporting the scale with the substrate.

26. A family of at least two position encoding systems, for use in a corresponding family of at least two large-format automatic image-related devices; each of said image-related devices having a chassis for supporting an image-bearing sheet and having a carriage which scans across the chassis carrying apparatus for forming or sensing marks on the sheet; and said family of position encoding systems comprising, in each said position encoding system:

a respective elongated metal encoder-strip substrate that has two ends secured at opposite sides of such chassis, and a respective elongated polymeric encoder-strip scale secured to the substrate and supported thereby, said scale having indicia exposed for use in determining such carriage position with respect to such chassis; and wherein the substrates in at least two of said position encoding systems are identical to each other; and the scale and substrate are differently disposed in relation to each other, in said at least two position encoding systems.

27. The family of position encoding systems of claim 26, wherein:

the scales in said at least two of said position encoding systems are also identical to each other.

28. The family of position encoding systems of claim 26, wherein:

the substrates are longer than the scales; and the scales are secured at different positions longitudinally along the substrates, in said at least two position encoding systems.

29. The family of position encoding systems of claim 26, wherein:

in one of the position encoding systems the scale extends upward from the substrate; and in another of the position encoding systems the scale extends downward from the substrate.

30. A family of at least two position encoding systems, for use in a corresponding family of at least two large-format automatic image-related devices; each of said image-related device having a chassis for supporting an image-bearing sheet and having a carriage which scans across the chassis carrying apparatus for forming or sensing marks on the sheet; and said family of position encoding systems comprising, in each said position encoding system:

a respective elongated metal encoder-strip substrate that has two ends secured at opposite sides of such chassis, and a respective elongated polymeric encoder-strip scale secured to the substrate and supported thereby, said scale having indicia exposed for use in determining such carriage position with respect to such chassis; and wherein the scales in at least two of said position encoding systems are identical; and the scale and substrate are differently disposed in relation to each other, in said at least two position encoding systems.

31. The family of position encoding systems of claim 30, particularly for use with a first one of the image-related devices that has a relatively wide chassis to accommodate an auxiliary module adjacent to supported sheets, and also for use with a second one of the image-related devices that has a relatively narrow chassis and lacks the auxiliary module; and wherein:

one of said position encoding systems comprises a relatively long substrate to span the relatively wide chassis of the first one of the image-related devices; and another of said position encoding systems comprises a relatively short substrate to span the relatively narrow chassis of the second one of the image-related devices.

* * * * *